United States Patent
Takashima et al.

(10) Patent No.: US 9,540,038 B2
(45) Date of Patent: Jan. 10, 2017

(54) CONTROL APPARATUS FOR VEHICLE

(75) Inventors: Toru Takashima, Susono (JP);
Norihisa Nishikawa, Susono (JP);
Mitsutaka Tanimoto, Susono (JP);
Tetsuhiro Narita, Nishima (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 121 days.

(21) Appl. No.: 13/806,894

(22) PCT Filed: Jun. 30, 2010

(86) PCT No.: PCT/JP2010/061184
§ 371 (c)(1),
(2), (4) Date: Dec. 26, 2012

(87) PCT Pub. No.: WO2012/001786
PCT Pub. Date: Jan. 5, 2012

(65) Prior Publication Data
US 2013/0103264 A1 Apr. 25, 2013

(51) Int. Cl.
*B62D 6/00* (2006.01)
*B60T 8/1764* (2006.01)
(Continued)

(52) U.S. Cl.
CPC ............ *B62D 6/00* (2013.01); *B60T 8/17557* (2013.01); *B60W 10/184* (2013.01); *B60W 10/20* (2013.01);
(Continued)

(58) Field of Classification Search
CPC .................................. B62D 6/00; B60T 8/1764
See application file for complete search history.

(56) References Cited

U.S. PATENT DOCUMENTS

| 2004/0158377 | A1 | 8/2004 | Matsumoto |
| 2005/0205339 | A1* | 9/2005 | Aizawa ............... B60T 8/17552 180/443 |
| 2009/0024279 | A1* | 1/2009 | Takeda et al. ................... 701/41 |

FOREIGN PATENT DOCUMENTS

| EP | 1 674 359 A1 | 6/2006 |
| JP | 3 292221 | 12/1991 |

(Continued)

OTHER PUBLICATIONS

International Search Report Issued Oct. 12, 2010 in PCT/JP10/61184 Filed Jun. 30, 2010.

(Continued)

*Primary Examiner* — Basil T Jos
(74) *Attorney, Agent, or Firm* — Oblon, McClelland, Maier & Neustadt, L.L.P.

(57) ABSTRACT

A control apparatus for controlling a vehicle which is provided with a braking/driving force varying device capable of individually changing a braking/driving force acting on each of wheels (FL, FR, RL, RR) with respect to each wheel. The control apparatus includes a target state quantity setting device for setting a target state quantity corresponding to a target motion state of the vehicle; and a target braking/driving force setting device for setting a target braking/driving force, which is a target value of the braking/driving force, such that a state quantity corresponding to the target state quantity and a steering reaction force transmitted to a steering apparatus from the wheel are the set target state quantity and a predetermined target steering reaction force, respectively, on the basis of a relative relation, which is set in advance, between the state quantity and the steering reaction force, and a left-right braking/driving force difference of front wheels and a left-right braking/driving force difference of rear wheels.

10 Claims, 3 Drawing Sheets

(51) Int. Cl.
*B60W 10/184* (2012.01)
*B60W 10/20* (2006.01)
*B60W 30/12* (2006.01)
*B62D 5/00* (2006.01)
*B62D 5/04* (2006.01)
*B60T 8/1755* (2006.01)

(52) U.S. Cl.
CPC .............. *B60W 30/12* (2013.01); *B62D 5/008* (2013.01); *B62D 5/0472* (2013.01); *B60T 2201/08* (2013.01); *B60T 2201/087* (2013.01); *B60W 2510/202* (2013.01); *B60W 2710/182* (2013.01)

(56) References Cited

FOREIGN PATENT DOCUMENTS

| | | |
|---|---|---|
| JP | 6 336169 | 12/1994 |
| JP | 2006 182050 | 7/2006 |
| JP | 2006 187047 | 7/2006 |
| JP | 2006 193156 | 7/2006 |
| JP | 2009 248599 | 10/2009 |
| JP | 2009 274482 | 11/2009 |

OTHER PUBLICATIONS

Extended Search Report issued Aug. 18, 2014 in European Patent Application No. 10854083.2.

\* cited by examiner

CONTROL APPARATUS FOR VEHICLE

TECHNICAL FIELD

The present invention relates to a control apparatus for a vehicle which can be applied to a vehicle having various automatic driving functions, such as lane keeping assist (LKA: steering assist for lane keeping driving).

BACKGROUND ART

As a method related to this type of apparatus, there has been suggested a method of controlling an automatic steering apparatus provided with a motor 1 for controlling a steering angle and a motor 2 for controlling steering torque (refer to patent document 1). According to the method of controlling the automatic steering apparatus disclosed in the patent document 1, a steering reaction force caused by the automatic steering can be canceled by the torque of the motor 2.

Incidentally, there has been also suggested an apparatus for controlling a braking force of each wheel to generate target yaw if it is determined that a vehicle deviates from a lane (refer to patent document 2).

Moreover, there has been suggested an apparatus for controlling a braking/driving force of each wheel such that a yaw rate of a vehicle is a target yaw rate (refer to patent document 3).

PRIOR ART DOCUMENT

Patent Document

Patent document 1: Japanese Patent Application Laid Open No. Hei 6-336169
Patent document 2: Japanese Patent Application Laid Open No. 2006-193156
Patent document 3: Japanese Patent Application Laid Open No. Hei 3-292221

DISCLOSURE OF INVENTION

Subject to be Solved by the Invention

The steering torque is a factor influencing a steering operation which is intentionally performed by a driver. Therefore, if the steering reaction force generated in performing this type of automatic steering is canceled by the steering torque, the steering torque caused by the driver performing the steering operation on the basis of the driver's intention interferes with the torque for canceling the steering reaction force, which may make the driver feel uncomfortable in some cases.

In other words, the method in the patent document 1 has such a technical problem that it is hard to cancel the steering reaction force caused by the automatic steering without making the driver feel uncomfortable.

Moreover, according to the method in the patent document 1, assist torque for canceling the steering reaction force is operated or calculated on the basis of the steering torque detected in accordance with the steering reaction force. Namely, the steering reaction force is estimated after being actualized as a detectable degree of steering torque.

In other words, the method in the patent document 1 also has such a technical problem that the steering reaction force remains without being canceled in a significant period of time to the extent that the driver can perceive the steering reaction force, because the steering reaction force can be detected only as an actual phenomenon.

Those technical problems may occur in the same manner even when applying the techniques or technologies disclosed in the patent documents 2 and 3, which have neither any description nor suggestion about the steering reaction force, while the automatic steering is realized by the braking/driving force. In view of the above problems, it is therefore an object of the present invention to provide a control apparatus for a vehicle capable of suppressing the steering reaction force transmitted from steered wheels without interfering with steering inputs of the driver, when various automatic steering is performed.

Means for Solving the Subject

The above object of the present invention can be achieved by a control apparatus for controlling a vehicle, the vehicle comprising a braking/driving force varying device capable of individually changing a braking/driving force acting on each of wheels, with respect to the each wheel, said control apparatus comprising: a target state quantity setting device for setting a target state quantity corresponding to a target motion state of the vehicle; and a target braking/driving force setting device for setting a target braking/driving force, which is a target value of the braking/driving force, such that a state quantity corresponding to the target state quantity and a steering reaction force transmitted to a steering apparatus from the wheel are the set target state quantity and a predetermined target steering reaction force, respectively, on the basis of a relative relation, which is set in advance, between the state quantity and the steering reaction force, and a left-right braking/driving force difference of front wheels and a left-right braking/driving force difference of rear wheels.

The vehicle of the present invention is provided with the braking/driving force varying device.

The braking/driving force varying device is a device capable of changing the braking force, the driving force, or both the forces acting on each of the wheels (including tires) provided for the vehicle, with respect to the each wheel, individually of one another. The braking/driving force varying device can adopt practical aspects, such as, for example, an in-wheel motor system, a driving force variable differential mechanism, or various electronic controlled braking systems (ECBs) including an anti-lock braking system (ARS), as a preferred form.

According to the braking/driving force varying device, the braking/driving force difference can be generated between the left and right wheels, regarding each of the front wheels and the rear wheels. If there is the braking/driving force difference between the left and right wheels, the vehicle turns to the side of the wheel having a relatively small driving force in the case of a driving force difference, and to the side of the wheel having a relatively large braking force in the case of a braking force difference, in accordance with the braking/driving force difference.

The control apparatus for the vehicle of the present invention is an apparatus for controlling such a vehicle, and can adopt forms of various computer systems, such as, for example, various processing units like a single or a plurality of electronic control units (ECUs) or the like, various controllers or microcomputer apparatuses, which can include one or a plurality of central processing units (CPUs), micro processing units (MPUs), various processors or various controllers, or various memory devices such as a read only memory (ROM), a random access memory (RAM), a buffer memory or a flush memory, as occasion demands.

According to the control apparatus for the vehicle of the present invention, in its operation, the target state quantity corresponding to the target motion state of the vehicle is set by the target state quantity setting device.

The "target motion state" of the present invention means a motion state targeted by the vehicle and a motion state which can be directed by the control of the braking/driving force via the braking/driving force varying device. As described above, the braking/driving force varying device is a device capable of controlling turning behavior of the vehicle by using the left-right braking/driving force differences of the front wheels and the rear wheels. Therefore, the target motion state of the vehicle means driving on a target lane, driving along a target route, or the like, as a preferred form.

The "target state quantity" of the present invention is a vehicle state quantity corresponding to the target motion state as described above, and is a state quantity for defining the turning behavior of the vehicle. The target state quantity is, for example, a target value of a vehicle yaw rate, a vehicle body slip angle (which is an angle with respect to a turning tangential direction of the vehicle and an angle between the direction of a vehicle body and an instantaneous moving direction of the vehicle body), or lateral acceleration, or the like, as a preferred form.

Incidentally, the target state quantity setting device sets the target state quantity, for example, on the basis of a positional state deviation as a physical quantity which can be a reference value for driving the vehicle along a target driving route (i.e. which is a deviation for defining a relative positional relation between the target driving route to maintain and the vehicle, and which can include the deviation of the lateral position of the vehicle with respect to the target driving route, a yaw angle deviation, or the like, as a preferred form), or further with respect to a driving condition such as a vehicle speed. The target state quantity may be mapped in a form corresponding to various parameter values and stored in a proper memory device in advance, or may be derived in accordance with a proper arithmetic algorithm, an arithmetic expression, or the like at each time.

On the other hand, if the turning behavior of the vehicle is controlled by maintaining the vehicle state quantity at the target state quantity set by the target state quantity setting device or bringing the vehicle state quantity close to the target state quantity and if the aforementioned target motion state is realized by a type of automatic steering, the steering reaction force represented, for example, by self-aligning torque of the steered wheels or the like can act on the steering apparatus, which is a mechanism for transmitting the steering input to the steered wheels and which includes the steering inputting device, such as a steering wheel.

The steering reaction force can be a so-called "response" of steering if the driver gives a steering retention force to the steering inputting device. However, since vehicle motion control for the target motion state is a type of automatic steering (of course, the control itself may be started on the driver's intention), the steering reaction force easily makes the driver feel uncomfortable. Moreover, the steering reaction force is a reaction force for rotating the steering inputting device in a direction opposite to the original turning direction. Thus, in so-called hands-free driving in which the driver does not give the steering retention force, the vehicle motion control can be influenced by turning the steering inputting device in the opposite turning direction.

By the way, since the braking/driving force varying device can independently control the braking/driving force of each wheel, the braking/driving force varying device has at least two types of control parameters, which are a front wheel driving force difference and a rear wheel driving force difference, as control parameters which correlate with the turning behavior.

Here, according to a known equation of motion, the number of the control parameters is equal to the degree of freedom of the vehicle state quantity. In other words, if the front wheel driving force difference and the rear wheel driving force difference can be individually controlled, the vehicle state quantity has two degrees of freedom.

Therefore, if one of the state quantities with two degrees of freedom is set to be a state quantity used as a setting target by the target state quantity setting device (e.g. the yaw rate, the vehicle body slip angle, etc.) and if the other state quantity is set to be a value corresponding to the steering reaction force, it is possible to derive the control parameters required to obtain a desired steering reaction force, and contrarily, to derive the steering reaction force corresponding to any control parameter, on the basis of the equation of motion.

The control apparatus for the vehicle of the present invention aims at this point and is configured to suppress the steering reaction force which does not make the driver feel uncomfortable, by the action of the target braking/driving force setting device.

In other words, according to the control apparatus for the vehicle of the present invention, by virtue of the target braking/driving force setting device, the target braking/driving force of each wheel is set such that the state quantity corresponding to the target state quantity and the steering reaction force described above are the target state quantity and the predetermined target steering reaction force described above, respectively.

As described above, according to the equation of motion, a fixed relative relation can be established between the vehicle state quantity and the steering reaction force, and the left-right braking/driving force difference of each of the front and rear wheels. The target braking/driving force setting device derives the left-right braking/driving force differences of the front and rear wheels which can realize the target state quantity and the target steering reaction force on the basis of the relative relation, and sets the target braking/driving force from the derived left-right braking/driving force differences of the front and rear wheels.

If the target braking/driving force is set in this manner and if the braking/driving force of each wheel is controlled in accordance with the set target braking/driving force, the left-right braking/driving force difference of the front wheels and the left-right braking/driving force difference of the rear wheels are maintained at or brought close to proper values, and it is thus possible to maintain the vehicle state quantity at the target state quantity or to bring the vehicle state quantity close to the target state quantity while realizing the target steering reaction force. Incidentally, the situation in which the vehicle state quantity is maintained at or brought close to the target state is practically equivalent to the situation in which the vehicle motion state is maintained at or brought close to the target motion state.

The target steering reaction force may be a fixed value or a variable value. If the target steering reaction force is the variable value, a relation between the target steering reaction force and parameters may be defined by a map or the like. Alternatively, the target steering reaction force may be set individually and specifically at each time, on the basis of an algorithm prepared in advance.

Here, if the target steering reaction force as the desired steering reaction torque can be obtained, deterioration of drivability is dramatically suppressed in comparison with a case where some steering reaction force is generated in the course of nature in view of the control of the braking/driving force. This is because the target steering reaction force can be foreseen on the driver's side or can be set so as not to make the driver feel uncomfortable. Moreover, in particular, if the target steering reaction force has a value corresponding to zero (which includes a value of zero and which conceptually includes a value defined not to be perceived by the driver as the deterioration of the drivability on the basis of experiments, experiences, theories, simulations or the like in advance), the steering reaction force can be canceled and the so-called hands-free driving can be realized when the vehicle state quantity is maintained at or brought close to the target state quantity.

Moreover, according to the control apparatus for the vehicle of the present invention, the control of the vehicle state quantity and the control of the steering reaction force are managed in an integrated manner by the braking/driving force varying device. In other words, in realizing the control of the vehicle state quantity and the control of the steering reaction force, there is no intervention in the steering angle of the steered wheels and the steering torque, and thus, there is little interference in the driver's steering operation. Therefore, for the steering operation performed by the driver on the basis of the driver's intention, appropriate steering torque is given, and preferable drivability is ensured. Moreover, according to the integrated management as described above, there is no time delay between the control of the vehicle state quantity and the control of the steering reaction force, and the steering reaction force can be suppressed in real time.

In other words, the control apparatus for the vehicle of the present invention is apparently superior, in promptness, control, and accuracy, to the technical idea in which it is necessary to go through the processes of estimating the steering reaction force and applying by some means a force against the estimated steering reaction force.

Moreover, considering that the integrated management can be performed, the control apparatus for the vehicle of the present invention can be applied, regardless of the presence or absence of various steering assistance apparatuses, such as, for example, electronic controlled power steering (EPS), variable gear ratio steering (VGRS), active rear steering (ARS), 4-wheels steering (4WS), or steering by wire (SBW). Therefore, the control apparatus for the vehicle of the present invention is practically useful in having high versatility.

Incidentally, as described above, the control parameters corresponding to the state quantity and the steering reaction force are the left-right braking/driving force differences of the front wheels and the rear wheels; however, the braking/driving force of each wheel for providing the front wheel braking/driving force difference and the rear wheel braking/driving force difference which satisfy the respective target values of the state quantity and the steering reaction force is not necessarily unique or definitive. Therefore, the target braking/driving force setting device may set, as the target braking/driving force, an optimal solution suitable for the driving condition of the vehicle, the driver's intention, or the like at that time point.

In one aspect of the control apparatus for the vehicle of the present invention, it is further provided with a controlling device for performing automatic steering control indicative of controlling the braking/driving force varying device such that the braking/driving force is the set target braking/driving force.

According to this aspect, the automatic steering control is performed by the controlling device, and the braking/driving force varying device is controlled such that the braking/driving force of each wheel is the target braking/driving force. Therefore, it is possible to easily maintain the vehicle state quantity at the target state quantity or bring the vehicle state quantity close to the target state quantity while obtaining the target steering reaction force as the steering reaction force.

Incidentally, in this aspect, it is further provided with a determining device for determining presence or absence of a driver's steering input, said controlling device may end the automatic steering control if it is determined that there is the steering input in a period of performing the automatic steering control.

According to this aspect, the automatic steering is ended if there is the driver's steering input in the period of performing the automatic steering control. Therefore, it is possible to prevent the deterioration of the drivability without the automatic steering control hindering the steering operation based on the driver's steering intention.

Incidentally, at this time, the determining device may determine the presence or absence of the steering input in accordance with any rule and principle.

Moreover, in the aspect comprising the determining device, said determining device determines whether or not at least one of driver steering torque and a driver steering angle is greater than or equal to a standard value, as the presence or absence of the steering input, and said controlling device may end the automatic steering control if the at least one is greater than or equal to the standard value.

The driver steering torque and the driver steering angle are so to speak the steering inputs, and are thus preferable as determination indices associated with the determination of the presence or absence of the steering input. In particular, if it is determined that there is the steering input in cases where the driver steering torque and the driver steering angle are greater than or equal to the respective standard values, the determination accuracy associated with the determination of the presence or absence of the steering input can be preferably ensured.

In another aspect of the control apparatus for the vehicle of the present invention, the target steering reaction force is less than or equal to an allowable upper limit set in advance.

According to this aspect, if the set target braking/driving force is realized, the steering reaction force when the vehicle state quantity is maintained at or brought close to the target state quantity is less than or equal to the allowable upper limit. Therefore, it is possible to suppress the interference between the steering reaction force and the driver's steering operation to the extent that there is no practical problem. Incidentally, the allowable upper limit may be set such that the interference with the driver's steering operation is within a range in which the driver does not feel uncomfortable, experimentally, experientially, theoretically, or by simulation from a human engineering standpoint, or the like.

In particular, if the allowable upper limit is the value corresponding to zero described above, the steering reaction force is practically cancelled. This solves such a concern that the steering reaction force may cause an unexpected change in the vehicle behavior in the hands-free driving, and realizes the preferable hands-free driving.

In another aspect of the control apparatus for the vehicle of the present invention, the state quantity is a yaw rate of the vehicle, and said target state quantity setting device sets a target yaw rate, which is a target value of the yaw rate, as the target state quantity.

According to this aspect, the target yaw rate, which is the target value, is also set for the yaw rate as the target state quantity. Since the yaw rate is an index capable of preferably indicating the turning behavior of the vehicle, the yaw rate is preferable as the state quantity of the present invention.

In another aspect of the control apparatus for the vehicle of the present invention, said target braking/driving force setting device sets the target braking/driving force on the basis of a kingpin offset, which is a distance between contact center of the steered wheels and virtual contact points of a kingpin axis of the steered wheels, as one portion of the relative relation.

A relation between the left-right driving force difference of the steered wheels and the steering reaction force is significantly influenced by the kingpin offset. Therefore, by considering the kingpin offset as one portion of the aforementioned relative relation referred to by the target braking/driving force setting device, the steering reaction force can be maintained at or brought close to the target steering reaction force, accurately.

In another aspect of the control apparatus for the vehicle of the present invention, it is further provided with a driver's intention specifying device for specifying a driver's intention associated with a motion state of the vehicle, said target braking/driving force setting device adjusting the set target braking/driving force in accordance with the specified driver's intention.

According to this aspect, the driver's intention is specified by the driver's intention specifying device.

Here, the "driver's intention" means an intention which influences the motion state of the vehicle, and simply means, for example, an intention related to acceleration/deceleration. In this case, the driver's intention specifying device specifies the driver's intention with reference to an accelerator pedal pressing amount, a brake pedal pressing amount, or the like.

This driver's intention correlates with the motion state of the vehicle, and thus, without any consideration, the braking/driving force of each wheel, which correlates with the motion state of the vehicle, likely interferes with the driver's intention. As a simple example, in a situation in which the driver has an intention to accelerate (decelerate), if the target braking/driving force is the braking force (driving force), even if the state quantity and the steering reaction torque are maintained at the target values, the driver likely feel uncomfortable.

Thus, in this aspect, the target braking/driving force setting device adjusts the set target braking/driving force in accordance with the specified driver's intention. Here, the term "adjust" means to appropriately change the distribution ratio of the braking/driving force within the range of the braking/driving force difference to be realized, and preferably means to optimize it, or the like. The adjustment of the target braking/driving force as described above realizes the preferable motion state control which does not interfere with the driver's intention.

Incidentally, further to that, the target braking/driving force setting device may adjust the target braking/driving force such that the sum of the braking/driving forces of the respective wheels is the driving force if the driver has the intention to accelerate, and such that the sum of the braking/driving forces of the respective wheels is the braking force if the driver has the intention to decelerate.

In another aspect of the control apparatus for the vehicle of the present invention, it is further provided with a road surface state specifying device for specifying a road surface state, said target braking/driving force setting device adjusting the set target braking/driving force in accordance with the specified road surface state.

According to this aspect, the road surface state is specified by the road surface state specifying device.

Here, the "road surface state" means the state of the road surface which influences the motion state of the vehicle, and simply means a slope or inclination of the road surface, a friction coefficient of the road surface, or the like. In this case, the road surface state specifying device may obtain information about the road surface state via various road-to-vehicle communication apparatuses which constitute one portion of various transportation infrastructure systems, such as, for example, known various car navigation systems and an Intelligent Transport System (ITS), and may use the information as a reference value when specifying the road surface state.

This road surface state correlates with the motion state of the vehicle, and thus, without any consideration, the braking/driving force of each wheel, which also correlates with the motion state of the vehicle, likely promotes a change in the vehicle state quantity influenced by the road surface state. As a simple example, in a situation in which the road surface has an upgrade or ascent (downgrade or descent), if the target braking/driving force is the braking force (driving force), the deceleration (acceleration) of the vehicle is likely induced.

Thus, in this aspect, the target braking/driving force setting device adjusts the set target braking/driving force in accordance with the specified road surface state. Here, the term "adjust" means to appropriately change the distribution ratio of the braking/driving force within the range of the braking/driving force difference to be realized, and preferably to optimize it, or the like. The adjustment of the target braking/driving force as described above realizes the preferable motion state control which does not promote the change in the vehicle state quantity by the road surface state, in other words, which can suppress the change in the state quantity.

Incidentally, further to that, the target braking/driving force setting device may adjust the target braking/driving force such that the sum of the braking/driving forces of the respective wheels is the driving force if the road surface has the upgrade or ascent, and such that the sum of the braking/driving forces of the respective wheels is the braking force if the road surface has the downgrade or descent.

In another aspect of the control apparatus for the vehicle of the present invention, said target braking/driving force setting device sets the target braking/driving force to prioritize a driving force over a braking force.

According to this aspect, in setting the target braking/driving force, the driving force is prioritized over the braking force. In other words, if the left-right driving force differences of the front wheels and the rear wheels required for the vehicle motion control are realized by the driving force, basically, the left-right driving force differences are realized by adjusting the driving force. Thus, it is possible to slow the progress of the abrasion and deterioration of braking members accompanied by the application of the braking force to each of the wheels, which is extremely useful in quality control.

The operation and other advantages of the present invention will become more apparent from an embodiment explained below.

MODE FOR CARRYING OUT THE INVENTION

Hereinafter, an embodiment of the vehicle control apparatus of the present invention will be explained with reference to the drawings.

Embodiment of the Invention

<Configuration of Embodiment>

Figure 1:
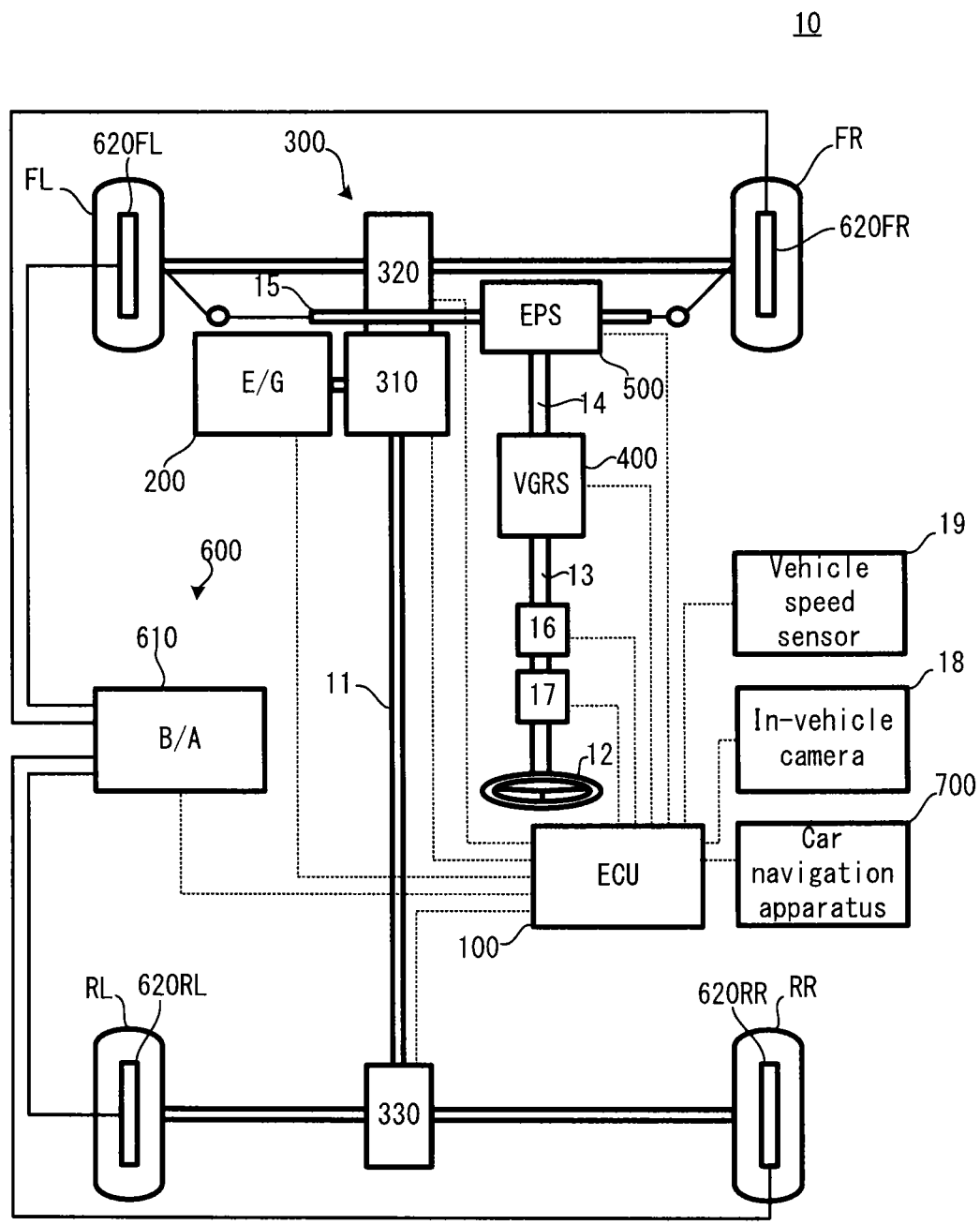
FIG. 1 is a schematic configuration diagram conceptually illustrating a configuration of a vehicle in an embodiment of the present invention.

Firstly, with reference to FIG. 1, a configuration of a vehicle 10 in an embodiment of the present invention will be explained. FIG. 1 is a schematic configuration diagram conceptually illustrating a basic configuration of the vehicle 10.

In FIG. 1, a vehicle 10 is provided with a front left wheel FL, a front right wheel FR, a left rear wheel RL, and a right rear wheel RR. The vehicle 10 is configured to move in a desired direction due to a steering angle change of the left front wheel FL and the right front wheel, which are steered wheels.

The vehicle 10 is provided with an ECU 100, an engine 200, a driving force distributing apparatus 300, a VGRS actuator 400, an EPS actuator 500, an electronic controlled braking system (ECB) 600, and a car navigation apparatus 700.

The ECU 100 is provided with a central processing unit (CPU), a read only memory (ROM), and a random access memory (RAM), each of which is not illustrated. The ECU 100 is an electronic control unit capable of controlling all the operations of the vehicle 10. The ECU 100 is one example of the "control apparatus for the vehicle" of the present invention. The ECU 100 is configured to perform LKA control described later, in accordance with a control program stored in the ROM.

Incidentally, the ECU 100 is a unified or integrated electronic control unit configured to function as one example of each of the "target state quantity setting device", the "target braking/driving force setting device", the "controlling device", the "determining device", the "driver's intention specifying device", and the "road surface state specifying device" of the present invention. The operations of each of the devices are all performed by the ECU 100. The physical, mechanical and electrical configurations of each of the devices of the present invention, however, are not limited to this, and each of the devices may be configured as various computer systems, such as, for example, a plurality of ECUs, various processing units, various controllers, or microcomputer apparatuses.

The engine 200 is a V-type six cylinder gasoline engine which functions as a driving source of the vehicle 10. Incidentally, the power source of the vehicle of the present invention is not limited to an internal combustion engine having various practical aspects (where the engine 200 is also one example thereof) as a concept including an engine capable of converting fuel combustion to mechanical power and extracting it, but the power source may be a rotating electrical machine such as a motor. Alternatively, the vehicle may be a so-called hybrid vehicle in which they are cooperatively controlled. A crankshaft as a driving force output shaft of the engine 200 is connected to a center differential apparatus 310 as one constituent of the driving force distributing apparatus. Incidentally, the detailed structure of the engine 200 correlates weakly with the scope or gist of the present invention, and its details are thus omitted here.

The driving force distributing apparatus 300 is one example of the "braking/driving force varying device" of the present invention, configured to distribute engine torque Te transmitted via the aforementioned crankshaft from the engine 200, to the front wheels and the rear wheels at a predetermined ratio, and configured to change the driving force distribution of the left and right wheels in each of the front wheels and the rear wheels. The driving force distributing apparatus 300 is provided with a center differential apparatus 310 (hereinafter referred to as a "center differential 310" as occasion demands), a front differential apparatus 320 (hereinafter referred to as a "front differential 320" as occasion demands), and a rear differential apparatus 330 (hereinafter referred to as a "rear differential 330" as occasion demands).

The center differential 310 is a limited slip differential (LSD: a differential mechanism with a differential limiting function) for distributing the engine torque Te supplied from the engine 200, to the front differential 320 and the rear differential 330. The center differential 310 distributes the engine torque Te to the front and rear wheels at a distribution ratio of (as one example but not limited to) 50:50 under a condition in which a load acting on the front and rear wheels is substantially constant. Moreover, if the rotational speed of either one of the front and rear wheels is higher than that of the other, differential limit is performed such that differential limiting torque acts on the one wheels and the torque is transferred to the other wheels. In other words, the center differential 310 is a so-called rotational-speed-sensing (viscous coupling) differential mechanism.

Incidentally, the center differential 310 is not limited to such a rotational-speed-sensing differential mechanism, but may be a torque-sensing differential mechanism in which a differential limiting action increases in proportion to input torque. Moreover, it may be a distribution-ratio-variable differential mechanism in which a differential action is exerted by a planetary gear mechanism, in which the differential limiting torque is continuously changed by the on-off control of an electromagnetic clutch, and in which a desired distribution ratio can be realized within a predetermined adjustable range. In any case, the center differential 310 may adopt various practical aspects regardless of being publicly known or unknown, as long as it can distribute the engine torque Te to the front wheels and the rear wheels.

The front differential 320 is a distribution-ratio-variable LSD capable of distributing the engine torque Te distributed to a front axle (front wheel axle) side by the center differential 310, further to the left and right wheels at a desired distribution ratio which is set within a predetermined adjustable range. The front differential 320 is provided with: a planetary gear mechanism including a ring gear, a sun gear, and a pinion carrier; and an electromagnetic clutch for providing differential limiting torque. To the ring gear of the planetary gear mechanism, a differential case is coupled. To the each of the sun gear and the carrier, the right or left axle is coupled. Moreover, the differential limiting torque is continuously controlled by electrification control for the electromagnetic clutch, and the distribution ratio of the torque is continuously variably controlled within a predetermined adjustable range which is determined in terms of the physical and electrical configurations of the front differential 320.

The front differential 320 is electrically connected to the ECU 100, and the electrification control for the electromagnetic clutch is also controlled by the ECU 100. Therefore, the ECU 100 can generate a desired front wheel braking/driving force difference (here, a driving force difference) $F_f$ via the drive control of the front differential 320. Incidentally, the configuration of the front differential 320 is not limited to what is exemplified herein, but can have various aspects regardless of being publicly known or unknown, as long as it can distribute a driving force (incidentally, the torque and the driving force have a unique or unambiguous relation) to the left and right wheels at a desired distribution ratio. In any case, such a left-right driving force distributing action is publicly known, and its details are not mentioned here to prevent a complicated explanation.

The rear differential 330 is a distribution-ratio-variable LSD capable of distributing the engine torque Te distributed to a rear axle (rear wheel axle) side via a propeller shaft 11 by the center differential 310, further to the left and right wheels at a desired distribution ratio which is set within a predetermined adjustable range. The rear differential 330 is provided with: a planetary gear mechanism including a ring gear, a sun gear, and a pinion carrier; and an electromagnetic clutch for providing a differential limiting torque. To the ring gear of the planetary gear mechanism, a differential case is coupled. To the each of the sun gear and the carrier, the right or left axle is coupled. Moreover, the differential limiting torque is continuously controlled by electrification control for the electromagnetic clutch, and the distribution ratio of the torque is continuously variably controlled within a predetermined adjustable range which is determined in terms of the physical and electrical configurations of the rear differential 330.

The rear differential 330 is electrically connected to the ECU 100, and the electrification control for the electromagnetic clutch is also controlled by the ECU 100. Therefore, the ECU 100 can generate a desired rear wheel braking/driving force difference (here, a driving force difference) Fr via the drive control of the rear differential 320. Incidentally, the configuration of the rear differential 330 is not limited to what is exemplified herein, but can have various aspects regardless of being publicly known or unknown, as long as it can distribute a driving force (incidentally, the torque and the driving force have a unique or unambiguous relation) to the left and right wheels at a desired distribution ratio. In any case, such a left-right driving force distributing action is publicly known, and its details are not mentioned here to prevent a complicated explanation.

The VGRS actuator 400 is a steering transmission ratio varying apparatus provided with a housing, a VGRS motor, a reduction gear mechanism, a locking mechanism (neither of which is illustrated), and the like.

In the VGRS actuator 400, the VGRS motor, the reduction gear mechanism, and the locking mechanism are accommodated in the housing. The housing is fixed to the end on the downstream side of an upper steering shaft 13 coupled with a steering wheel 12 as the steering inputting device, and the housing and the upper steering shaft 13 can rotate substantially integrally.

The VGRS motor is a DC brushless motor having a rotor as a rotator, a stator as a stationary part, and a rotating shaft as the output shaft of a driving force. The stator is fixed to the inside of the housing, and the rotor is rotatably held within the housing. The rotating shaft is coaxially rotatably fixed to the rotor, and its end on the downstream side is coupled with the reduction gear mechanism. To the stator, a driving voltage is supplied from a not-illustrated electric drive circuit.

The reduction gear mechanism is a planetary gear mechanism having a plurality of rotating elements which can perform differential rotation. One of the plurality of rotating elements is coupled with the rotating shaft of the VGRS motor, and one of the other rotating elements is coupled with the aforementioned housing. Moreover, the remaining rotating element is coupled with a lower steering shaft 14.

According to the reduction gear mechanism having such a configuration, the rotational speed of the upper steering shaft 13 according to the manipulated variable or operation amount of the steering wheel 12 (i.e. the rotational speed of the housing) and the rotational speed of the VGRS motor (i.e. the rotational speed of the rotating shaft) uniquely determine the rotational speed of the lower steering shaft 14 coupled with the remaining one rotating element. At this time, it is possible to perform increase/reduction control on the rotational speed of the lower steering shaft 14 by performing increase/reduction control on the rotational speed of the VGRS motor by means of the differential action between the rotating elements. In other words, the upper steering shaft 13 and the lower steering shaft 14 can perform relative rotation by the action of the VGRS motor and the reduction gear mechanism. Incidentally, in terms of the configuration of each rotating element in the reduction gear mechanism, the rotational speed of the VGRS motor is transmitted to the lower steering shaft 14 in a state in which it is reduced in accordance with a predetermined reduction ratio which is determined in accordance with a gear ratio between the rotating elements.

As described above, in the vehicle 10, since the upper steering shaft 13 and the lower steering shaft 14 can perform the relative rotation, a steering transmission ratio is continuously variable in a predetermined set range, where the steering transmission ratio is a ratio between a steering angle MA as the rotation amount of the upper steering shaft 13 and a steering angle δf of the front wheels as the steered wheels which is uniquely determined according to the rotation amount of the lower steering shaft 14 (which is also related to the gear ratio of a rack and pinion mechanism described later).

Incidentally, the locking mechanism is a clutch mechanism provided with a clutch element on the VGRS motor side and a clutch element on the housing side. In the condition that both the clutch elements engage with each other, the rotational speed of the upper steering shaft 13 matches the rotational speed of the rotating shaft of the VGRS motor. Thus, inevitably, the rotational speed of the lower steering shaft 14 also matches them. In other words, the upper steering shaft 13 and the lower steering shaft 14 are directly connected. The details of the locking mechanism are not mentioned here because it correlates weakly with the present invention.

Incidentally, the VGRS actuator 400 is electrically connected to the ECU 100, and its operations are controlled by the ECU 100.

In the vehicle 10, the rotation of the lower steering shaft 14 is transmitted to a rack and pinion mechanism. The rack and pinion mechanism is a steering transmission mechanism including a not-illustrated pinion gear connected to the end on the downstream side of the lower steering shaft 14 and a rack bar 15 in which gear teeth engaging with the gear teeth of the pinion gear are formed. The rotation of the pinion gear is converted to motion in a horizontal direction in FIG. 1 of the rack bar 15, by which a steering force is transmitted to each steered wheel via a tie rod and a knuckle (whose reference numerals are omitted) coupled with both ends of the rack bar 15. In other words, the transmission mechanism for the steering force from the steering wheel 12 to each front wheel is one example of the "steering apparatus" of the present invention.

The EPS actuator 500 is a steering torque assisting apparatus provided with an EPS motor as a DC brushless motor including: a not-illustrated rotor as a rotator to which a permanent magnet is attached; and a stator as a stationary part which surrounds the rotor. The EPS motor can generate assist torque TA in a direction of rotation of the rotor, which is rotated by the action of a rotating magnetic field formed in the EPS motor due to the electrification to the stator via a not-illustrated electric driving apparatus.

On the other hand, a not-illustrated reduction gear is fixed to a motor shaft as the rotating shaft of the EPS motor, and the reduction gear also directly or indirectly engages with a reduction gear disposed on the lower steering shaft 14. Thus, in the embodiment, the assist torque TA generated from the EPS motor functions as torque for assisting the rotation of the lower steering shaft 14. Thus, if the assist torque TA is applied in the same direction as that of driver steering torque MT applied to the upper steering shaft 13 via the steering wheel 12, a driver's steering load is reduced by the amount of the assist torque TA.

Incidentally, the EPS actuator 500 is electrically connected to the ECU 100, and its operations are controlled by the ECU 100.

The vehicle 10 is provided with a steering angle sensor 16 and a steering torque sensor 17.

The steering angle sensor 16 is an angle sensor capable of detecting the steering angle MA which indicates the rotation amount of the upper steering shaft 13. The steering angle sensor 16 is electrically connected to the ECU 100, and the detected steering angle MA is referred to by the ECU 100 with a regular or irregular period.

The steering torque sensor 17 is a sensor capable of detecting the driver steering torque MT given via the steering wheel 12 from a driver. Explaining it more specifically, the upper steering shaft 13 has such a structure that it is divided into an upstream part and a downstream part and that the parts are mutually coupled by using a not-illustrated torsion bar. To the both ends on the upstream side and the downstream side of the torsion bar, rings for detecting a rotational phase difference are fixed. The torsion bar is twisted in its rotational direction in accordance with the steering torque (i.e. the driver steering torque MT) transmitted via the upstream part of the upper steering shaft 13 when the driver of the vehicle 10 operates the steering wheel 12, and the steering torque can be transmitted to the downstream part with the twist generated. Therefore, upon the transmission of the steering torque, there is the rotational phase difference between the rings for detecting the rotational phase difference described above. The steering torque sensor 17 can detect the rotational phase difference, convert the rotational phase difference to the steering torque, and output it as an electrical signal corresponding to the driver steering torque MT. The steering torque sensor 17 is electrically connected to the ECU 100, and the detected driver steering torque MT is referred to by the ECU 100 with a regular or irregular period.

The ECB 600 is an electronically-controlled braking apparatus as another example of the "braking/driving force varying device" of the present invention, configured to apply a braking force individually to each of the left, right, front and rear wheels of the vehicle 10. The ECB 600 is provided with: a brake actuator 610; and braking apparatuses 620FL, 620FR, 620RL, and 620RR corresponding to the left front wheel FL, the right front wheel FR, the left rear wheel RL and the right rear wheel RR, respectively.

The brake actuator 610 is a hydraulic control actuator configured to supply hydraulic oil individually to each of the braking apparatuses 620FL, 620FR, 620RL, and 620RR. The brake actuator 610 is provided with a master cylinder, an electric oil pump, a plurality of hydraulic transmission paths, an electromagnetic valve disposed in each of the hydraulic transmission paths, and the like, and it can control the opening/closing state of the electromagnetic valve, thereby controlling the hydraulic pressure of the hydraulic oil supplied to a wheel cylinder provided for each braking apparatus, individually in each braking apparatus. The hydraulic pressure of the hydraulic oil has a one-on-one relation with the pressing force of a braking pad provided for each braking apparatus, and the high and low hydraulic pressures of the hydraulic oil correspond to the large and small braking forces of each braking apparatus, respectively.

The brake actuator 610 is electrically connected to the ECU 100, and the braking force applied to each wheel from each braking apparatus is controlled by the ECU 100.

The vehicle 10 is provided with an in-vehicle camera 18 and a vehicle speed sensor 19.

The in-vehicle camera 18 is an imaging apparatus, disposed on the front nose of the vehicle 10, capable of imaging a predetermined area ahead of the vehicle 10. The in-vehicle camera 18 is electrically connected to the ECU 100, and the imaged area ahead is sent out to the ECU 100 as image data with a regular or irregular period. The ECU 100 can analyze the image data and obtain various data necessary for the LKA control described later.

The vehicle speed sensor 19 is a sensor capable of detecting a vehicle speed V as the speed or velocity of the vehicle 10. The vehicle speed sensor 19 is electrically connected to the ECU 100, and the detected vehicle speed V is referred to by the ECU 100 with a regular or irregular period.

The car navigation apparatus 700 is an apparatus capable of providing various navigation information including information about the position of the vehicle 10, information about roads around the vehicle 10 (a road type, a road width, the number of lanes, a speed limit, a road shape, etc.), information about traffic lights, information about various facilities placed around the vehicle 10, information about traffic jams, environmental information, and the like, on the basis of signals obtained via a VICS antenna and a GPS antenna disposed in the vehicle 10. The car navigation apparatus 700 is electrically connected to the ECU 100, and its operation state is controlled by the ECU 100. Moreover, the ECU 100 can specify a slope or inclination of a driving route of the vehicle 10 from the car navigation apparatus 700, in the LKA control described later.

Operations of Embodiment

<Details of LKA Control>

Figure 2:
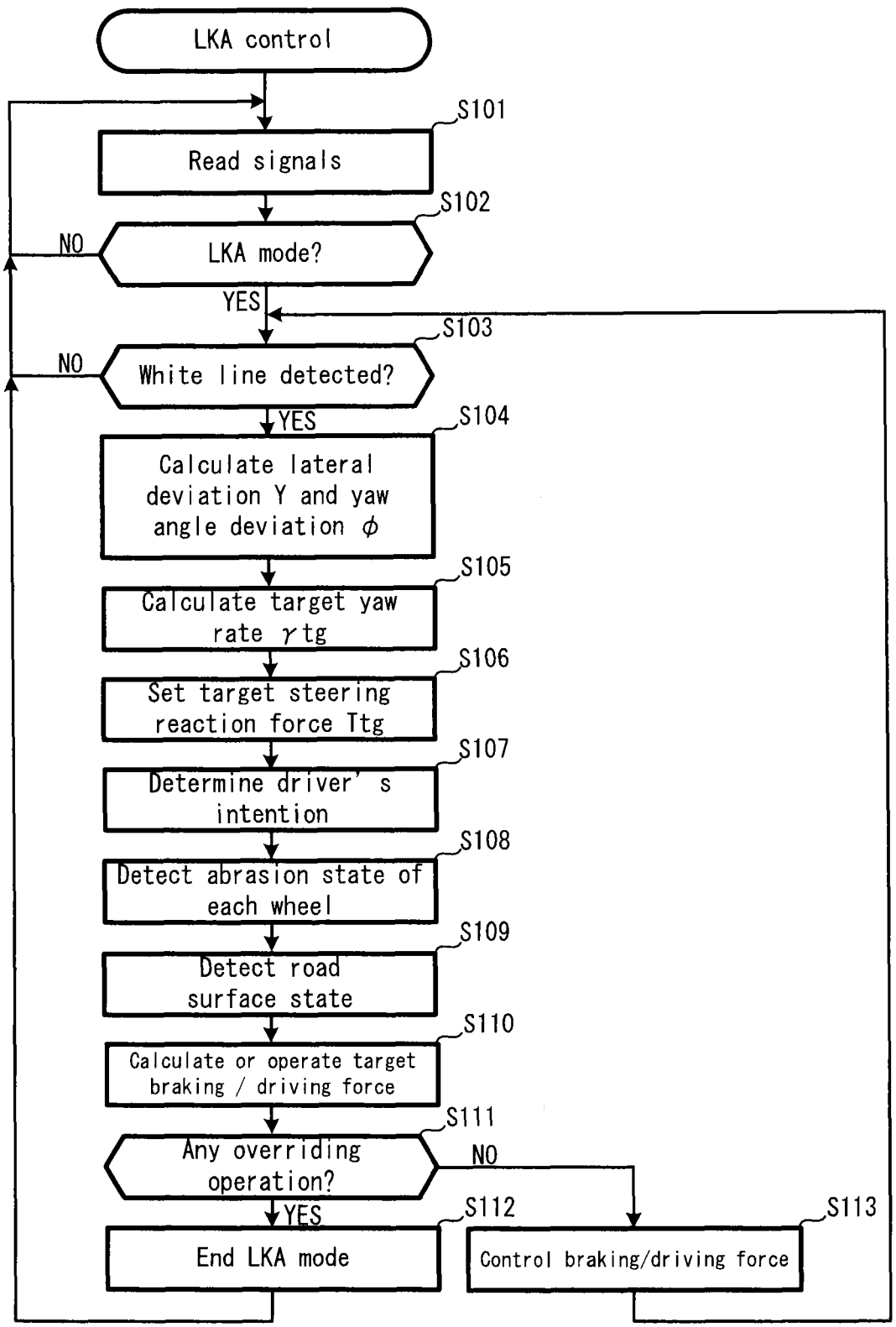
FIG. 2 is a flowchart illustrating LKA control performed in the vehicle in FIG. 1.

Hereinafter, with reference to FIG. 2, as the operations of the embodiment, an explanation will be given to the details of LKA control performed by the ECU 100. FIG. 2 is a flowchart illustrating the LKA control. Incidentally, the LKA (Lane Keeping Assist) control is control for making the vehicle 10 follow a target driving route (i.e. a lane in the embodiment), and it is one driving support control performed on the vehicle 10. Moreover, following the target driving route is namely one example of the "target motional state of the vehicle" in the present invention.

In FIG. 2, the ECU 100 reads various signals including operation signals of various switches or the like provided for the vehicle 10, various flags, sensor signals associated with the aforementioned various sensors, and the like (step S101), and determines whether or not a LKA mode is selected as a result of such an operation that an operation button, disposed in the interior of the vehicle 10 in advance, for exercising the LKA mode is operated by the driver or similar actions (step S102). If the LKA mode is not selected (the step S102: NO), the ECU 100 returns the processing to the step S101.

If the LKA mode is selected (the step S102: YES), the ECU 100 determines whether or not a white line (not necessarily white) for defining the target driving route of the LKA is detected on the basis of the image data sent out from the in-vehicle camera 18 (step S103).

If the white line is not detected (the step S103: NO), a virtual target driving route cannot be set, and the ECU 100 thus returns the processing to the step S101. On the other hand, if the white line is detected (the step S103: YES), the ECU 100 calculates various road surface information required when the vehicle 10 is made to follow the target driving route (step S104).

In the step S104, a lateral deviation Y, which is a deviation in the lateral direction of the white line and the vehicle 10, and a yaw angle deviation $\phi$ between the white line and the vehicle 10 are calculated on the basis of a known method.

If the various road surface information is calculated, the ECU 100 calculates a target yaw rate ytg as a target vehicle state quantity required to make the vehicle 10 follow the target driving route (step S105). The step S105 is one example of the operations of the "target state quantity setting device" of the present invention (particularly, corresponding to claim 6 indicative of setting a target yaw rate, which is a target value of a yaw rate, as the target state quantity).

The target state quantity is mapped in a form corresponding to the lateral deviation Y and the yaw angle deviation $\phi$ described above and is stored in a proper memory device, such as a ROM, in advance. The ECU 100 selects a relevant value, as occasion demands, in accordance with the various road surface information calculated in the step S104, thereby setting the target yaw rate ytg. Regarding the aspect of setting the target yaw rate ytg, various aspects can be applied regardless of being publicly known or unknown.

If the target yaw rate ytg is set, the ECU 100 sets target steering reaction torque Ttg (step S106). The target steering reaction torque Ttg is torque acting on the steering apparatus including the steering wheel 12 from the front wheels as the steered wheels in making the vehicle 10 follow the target driving route, and it is one example of the "steering reaction force" of the present invention.

In the embodiment, the target steering reaction torque Ttg is zero (i.e. corresponding to claim 5 indicating that the target steering reaction force is less than or equal to an allowable upper limit set in advance). The fact that the target steering reaction torque Ttg is zero means that it is not necessary to give steering retention torque to the steering wheel 12 when the vehicle 10 follows the target driving route and that hands-free driving is possible.

Then, the ECU 100 determines a driver's intention (step S107).

Here, the "driver's intention" in the embodiment means a driver's intention about the acceleration and deceleration of the vehicle. The ECU 100 refers to the sensor outputs of an accelerator opening sensor and a brake pedal sensor, which are not illustrated in FIG. 1, and determines whether or not each of their values is greater than or equal to respective one of set standard values.

If an accelerator opening degree Ta detected by the accelerator opening sensor is greater than or equal to the standard value, the ECU 100 determines that the driver has an intention to accelerate. If a brake pedal pressing amount Tb detected by the brake pedal sensor is greater than or equal to the standard value, the ECU 100 determines that the driver has an intention to decelerate.

Moreover, if any of them is less than the standard value, the ECU 100 determines that the driver has neither the intention to accelerate nor the intention to decelerate. The determination result of the driver's intention is temporarily stored in a volatile memory, such as a RAM. Incidentally, the step S107 is one example of the operations of the "driver's intention specifying device" of the present invention.

Then, the ECU 100 detects an abrasion state of each of the front and rear wheels (step S108).

Here, the "abrasion state of each of the front and rear wheels" in the embodiment means the abrasion state of the brake pad of each of the braking apparatuses corresponding to respective one of the wheels. Regarding the abrasion state of the brake pad, for example, if each wheel is provided with a sensor capable of detecting the degree of the abrasion state, then, the abrasion state may be detected with reference to the sensor output of each sensor. Alternatively, an integration value of the braking force applied to each wheel may be stored as a past driving history, and the abrasion state may be detected by estimating the abrasion state on the basis of the stored integration value of the braking force. The detection result of the abrasion state is temporarily stored in the volatile memory such as a RAM.

Moreover, the ECU 100 detects a road surface state of the driving route of the vehicle 10 (step S109).

Here, the "road surface state of the driving route" in the embodiment means the slope or inclination of the driving route. The slope of the driving route can be obtained via the car navigation apparatus 700. Incidentally, the slope of the driving route can be preferably gauged or known by providing a detecting device, such as a slope sensor. The detection result of the road surface state is temporarily stored in the volatile memory such as a RAM.

In the step S105 to the step S109, if the elements required for the calculation of a target braking/driving force are obtained, the ECU 100 calculates or operates the target braking/driving force as the braking/driving force required to follow the target driving route, respectively (step S110). A method of calculating or operating the target braking/driving force will be described later. Incidentally, the step S110 is one example of the operations of the "target braking/driving force setting device" of the present invention.

If the target braking/driving force is obtained, the ECU 100 determines whether or not there is an overriding operation by the driver (step S111). The overriding operation is a steering operation performed by the driver on his/her own intention, i.e. one of the steering inputs to be prioritized most in terms of vehicle driving control. The ECU 100 refers to the sensor outputs of the steering angle sensor 16 and the steering torque sensor 17 when determining whether or not there is the overriding operation, and determines that the overriding operation takes place if the driver steering angle MA is greater than or equal to a standard value MAth or if the driver steering torque MT is greater than or equal to a standard value MTth. Incidentally, the operation in the step S111 is one example of the operations of the "determining device" of the present invention.

If it is determined that the overriding operation takes place (the step S111: YES), the ECU 100 ends the LKA mode (step S112). If the LKA mode is ended, the processing is returned to the step S101, and a series of the process operations is repeated. Incidentally, a series of operations in the step S111 to the step S112 corresponds to claim 4 indicating that "the determining device determines whether or not at least one of driver steering torque and a driver steering angle is greater than or equal to a standard value, as the presence or absence of the steering input, and the controlling device ends the automatic steering control if the at least is greater than or equal to the standard value."

On the other hand, if the overriding operation does not take place (the step S111: NO), the ECU 100 controls at least one of the driving force distributing apparatus 300 and the ECB 600 so as to obtain the target braking/driving force calculated in the step S110. Incidentally, whether the target braking/driving force is realized by the driving force distributing apparatus 300 or by the ECB 600 or by both of them varies depending on the target braking/driving force calculated in the step S110.

If the braking/driving force is controlled, the processing is returned to the step S103, and a series of the process operations in the LKA mode is repeated. The LKA control is performed as described above.

<Details of Target Braking/Driving Force>

Here, the method of calculating or operating the target braking/driving force in the step S110 will be explained.

Figure 3:
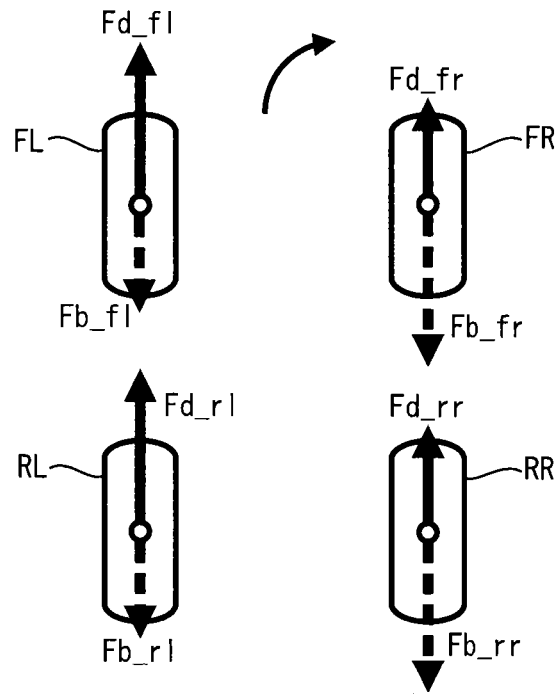
FIG. 3 is a conceptual diagram exemplifying a relation between breaking/driving force differences of front and rear wheels and a vehicle turning direction.

Firstly, with reference to FIG. 3, an explanation will be given to a relation between the braking/driving force acting on each wheel and the turning behavior of the vehicle 10. FIG. 3 is a conceptual diagram exemplifying a relation between the breaking/driving force acting on each wheel and a vehicle turning direction. Incidentally, in FIG. 3, portions overlapping those of FIG. 1 will carry the same reference numerals, and the explanation thereof will be omitted as occasion demands.

In FIG. 3, it is assumed that a left front driving force acting on the left front wheel FL is Fd_fl, that a right front driving force acting on the right front wheel FR is Fd_fr, that a left rear driving force acting on the left rear wheel RL is Fd_rl, and that a right rear driving force acting on the right rear wheel RR is Fd_rr (refer to respective solid lines in the drawing). It is also assumed that a left front braking force acting on the left front wheel FL is Fb_fl, that a right front braking force acting on the right front wheel FR is Fd_fr, that a left rear braking force acting on the left rear wheel RL is Fb_rl, and that a right rear braking force acting on the right rear wheel RR is Fb_rr (refer to respective dashed lines in the drawing).

Here, as illustrated, if a driving force difference is given to both the front and rear wheels and if a relation of Fd_fl>Fd_fr and Fd_rl>Fd_rr is established, the turning direction of the vehicle 10 is a right-turn direction, as illustrated by an arc in the drawing. This is because a moment acting in the right-turn direction is greater than a moment acting in a left-turn direction, on both the front and rear wheels.

On the other hand, as illustrated, if a braking force difference is given to both the front and rear wheels and if a relation of Fb_fl>Fb_fr and Fb_rl<Fb_rr is established, the turning direction of the vehicle 10 is also the right-turn direction, as illustrated by the arc in the drawing. This is also because the moment acting in the right-turn direction is greater than the moment acting in the left-turn direction, on both the front and rear wheels, as in the turning action caused by the driving force difference.

As described above, the vehicle 10 can be turned in a desired turning direction by providing the left-right braking/driving force difference for each of the front and rear wheels in the vehicle 10.

Figure 4:
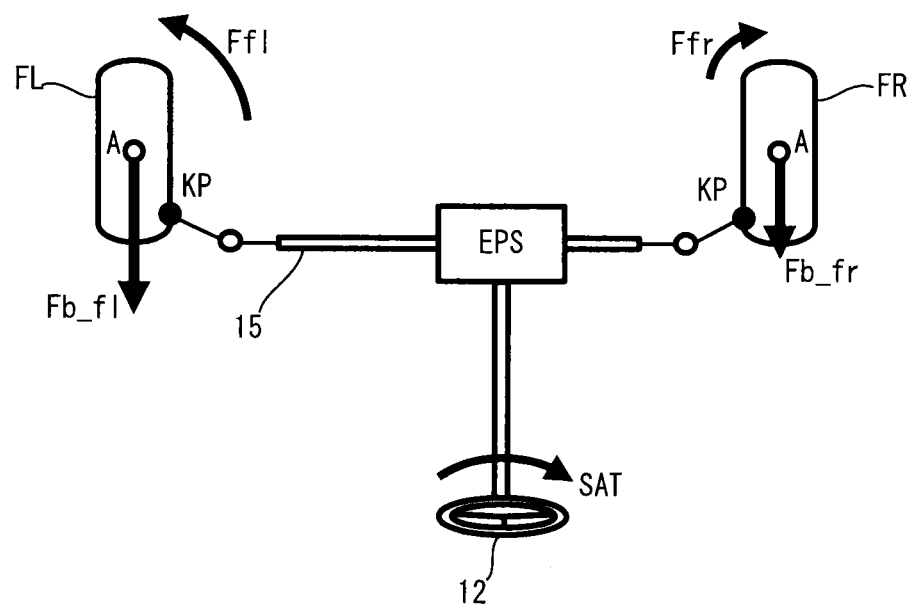
FIG. 4 is a view conceptually illustrating a direction of generated steering reaction torque if braking forces act on steered wheels.

Next, with reference to FIG. 4, an explanation will be given to a relation between the braking/driving forces acting on the steered wheels and steering reaction torque. FIG. 4 is a view conceptually illustrating a direction of generated steering reaction torque if the braking forces act on the steered wheels. Incidentally, in FIG. 4, portions overlapping those of FIG. 3 will carry the same reference numerals, and the explanation thereof will be omitted as occasion demands.

In FIG. 4, it is assumed that the left front braking force Fb_fl acts on the left front wheel FL, that the right front braking force Fb_fr acts on the right front wheel FR, and that a relation of Fb_fl>Fb_fr is established between the braking forces.

In this case, under the assumption that contact points of a kingpin axis of the steered wheels (which is a virtual steering axis connecting an upper pole joint and a lower pole joint) are KP (black circles) as illustrated, and that contact points of the steered wheels are A (white circles) as illustrated, a moment Ffl in the left-turn direction is generated on the left front wheel FL, and a moment Ffr in the right-turn direction is generated on the right front wheel FR. At this time, a magnitude correlation of the two moments is Ffl>Ffr from a magnitude correlation of the braking forces acting on the two wheels. On the steering apparatus coupled with the steered wheels, self-aligning torque SAT as illustrated acts in the right-turn direction as steering reaction torque T.

In other words, in the LKA control, in cases where the turning behavior of the vehicle is controlled by producing the left-right braking/driving force difference in each of the front and rear wheels, if no measures are taken, the driver needs to give the steering wheel 12 the steering retention torque which can resist the steering reaction torque T. The requirement of such a retention force may make the driver feel uncomfortable.

On the other hand, an equation of motion for the vehicle represented by the following equation (1) is established between a yaw rate γ and the steering reaction torque T, and the front wheel braking/driving force difference Ff and the rear wheel braking/driving force difference Fr. Incidentally, in the equation (1), $t_f$ denotes a front tread, $t_r$ denotes a rear tread, k denotes a kingpin offset, and M denotes a known vehicle motion matrix. Incidentally, the kingpin offset is a distance between the contact points of the kingpin axis and the contact points of the tires, and the kingpin offset corresponds to a distance between the black circles KP and the white circles A with reference to FIG. 4.

[Equation 1]

$$\begin{bmatrix} \gamma \\ T \end{bmatrix} = M^{-1} \begin{bmatrix} -\dfrac{t_f}{2} & -\dfrac{t_r}{2} \\ -k & 0 \end{bmatrix} \begin{bmatrix} F_f \\ F_r \end{bmatrix} \quad (1)$$

Moreover, the above equation (1) is deformed to obtain the following equation (2).

[Equation 2]

$$\begin{bmatrix} F_f \\ F_r \end{bmatrix} = \begin{bmatrix} -\dfrac{t_f}{2} & -\dfrac{t_r}{2} \\ -k & 0 \end{bmatrix} M \begin{bmatrix} \gamma \\ T \end{bmatrix} \quad (2)$$

The above equation (2) means that it is possible to derive the front wheel braking/driving force difference Ff and the rear wheel braking/driving force difference Fr to obtain the desired yaw rate γ and the desired steering reaction torque T. Therefore, by substituting the target yaw rate γtg and the target steering reaction torque Ttg (Ttg=0 in the embodiment) into γ and T in the above equation (2), it is possible to derive the front wheel braking/driving force difference Ff and the rear wheel braking/driving force difference Fr for maintaining a vehicle state quantity (yaw rate γ) at the target state quantity (target yaw rate γtg), or bringing the vehicle state quantity (yaw rate γ) close to the target state quantity (target yaw rate γtg), while canceling the steering reaction torque.

In the step S110 in FIG. 2, the ECU 100 firstly calculates the front wheel braking/driving force Ff and the rear wheel braking/driving force difference Fr for realizing the target yaw rate ytg and the steering reaction torque T, on the basis of the relation defined by the above equation (2) (i.e. one example of the "relative relation" of the present invention).

On the other hand, the value of the braking/driving force to act on each wheel for realizing the front wheel braking/driving force Ff and the rear wheel braking/driving force difference Fr calculated in this manner is not unique or definitive. For example, as exemplified in FIG. 3, one braking/driving force difference can be given by the driving force, the braking force, or both the driving force and the braking force. Moreover, the principles of the front wheels and the rear wheels are not necessarily the same. The front wheel braking/driving force can be given by the driving force (or the braking force), and the rear wheel braking/driving force can be given by the braking force (or the driving force).

Thus, the ECU 100 applies the following rules (A) to (D) when determining the target braking/driving force of each wheel which satisfies the calculated braking/driving force difference.

(A) Prioritize the driving force over.
(B) Assume that a sum of the braking/driving forces of the respective wheels matches the driver's intention.
(C) Add the driving force to the wheel having the abrasion of the braking apparatus.
(D) Assume that a sum of the braking/driving forces of the respective wheels matches the road surface slope.

The rule (A) is a priority measure not to promote the abrasion of the braking apparatus 620 for each wheel. The adjustment of the braking/driving force associated with the rule (A) is one example of the operation corresponding to claim 10.

The rule (B) is that the sum of the braking/driving forces of the respective wheels is set to be the driving force if the driver intends to accelerate, and is set to be the braking force if the driver intends to decelerate. The rule (B) is applied on the basis of the driver's intention determined in the step S107 in FIG. 2. Incidentally, the adjustment of the braking/driving force associated with the rule (B) is one example of the operation corresponding to claim 8.

The rule (C) is a priority measure not to promote the abrasion any more, with respect to the wheel whose braking apparatus 620 is worn away. The rule (C) is applied on the basis of the abrasion state of each wheel detected in the step S108 in FIG. 2.

The rule (D) is that the sum of the braking/driving forces of the respective wheels is set to be the driving force if the driving route has an upgrade, and is set to be the braking force if the driving route has a downgrade. The rule (D) is applied on the basis of the road surface state detected in the step S109 in FIG. 2. Incidentally, the adjustment of the braking/driving force associated with the rule (D) is one example of the operation corresponding to claim 9.

As explained above, according to the LKA control in the embodiment, the steering reaction torque T generated in making the vehicle 10 follow the target driving route is suppressed in real time, with the target steering reaction torque Ttg as a target value, as a part of braking/driving force control for realizing that the target driving route is followed. At this time, the suppression of the steering reaction torque T is realized without through the operation of a device which interferes with the driver's steering operation, such as the VGRS actuator 400 and the EPS actuator 500. Therefore, the measure of suppressing the steering reaction torque T can preferably reduce the uncomfortable feeling given to the driver, without interfering with the driver's steering operation.

Moreover, particularly in the embodiment, the target steering reaction torque Ttg has a zero value, which indicates that the uncomfortable feeling given to the driver in advance can be within an allowable range. Thus, it is realized to follow the target driving route without the driver practically applying the retention torque. In other words, preferable hands-free driving can be realized.

Moreover, as described above, according to the embodiment, following the target driving route (LKA mode) and controlling the steering reaction torque T are managed in an integrated manner by the braking/driving force varying device, which is provided with the driving force distributing apparatus 300 and the ECB 600. Thus, in realizing the following and the control, the VRGS actuator 400 and the EPS actuator 500 are not necessary. In a vehicle without having both the actuators, the LKA control in the embodiment can be broadly applied, and it is extremely useful in practice in terms of versatility.

The present invention is not limited to the aforementioned embodiment, but various changes may be made, if desired, without departing from the essence or spirit of the invention which can be read from the claims and the entire specification. A control apparatus for a vehicle, which involves such changes, is also intended to be within the technical scope of the present invention.

INDUSTRIAL APPLICABILITY

The present invention can be applied, for example, to a vehicle having a function of making a vehicle follow a target driving route.

DESCRIPTION OF REFERENCE CODES

FL, FR, RL, RR wheels
10 vehicle
11 propeller shaft
12 steering wheel
13 upper steering shaft
14 lower steering shaft
15 rack bar
16 steering angle sensor
17 steering torque sensor
100 ECU
200 engine
300 braking/driving force distributing apparatus
310 center differential mechanism
320 front differential mechanism
330 rear differential mechanism
400 VGRS actuator
500 EPS actuator
600 ECB
610 brake actuator
620FL, 620FR, 620RL, 620RR braking apparatus

The invention claimed is:

1. A control apparatus for controlling a vehicle, the vehicle comprising a braking/driving force varying device capable of individually changing a braking/driving force acting on each of wheels, with respect to the each wheel, said control apparatus comprising:
a controller, which controls a state quantity corresponding to a motion state of the vehicle and a steering reaction force transmitted to a steering apparatus from the wheel by controlling a left-right braking/driving force difference of front wheels and a left-right braking/driving force difference of rear wheels as control parameters, configured to
set a target state quantity which is a target value of the state quantity corresponding to a target motion state of the vehicle which is a target value of the motion state,
obtain the left-right braking/driving force difference of front wheels and the left-right braking/driving force difference of rear wheels, that makes the state quantity and the steering reaction force be the set target state quantity and a predetermined target steering reaction force,
set a target braking/driving force, which is a target value of the braking driving force, such that the obtained left-right braking/driving force difference of front wheels and the obtained left-right braking/driving force difference of rear wheels, that make a state quantity corresponding to the target state quantity and a steering reaction force transmitted to a steering apparatus from the wheel be the set target state quantity and a predetermined target steering reaction force, respectively, are realized, on the basis of a relative relation, which is set in advance, between the state quantity and the steering reaction force, and the left braking/driving force difference of front wheels and the left-right braking/driving force difference of rear wheels to specify a driver's intention associated with a motion state of the vehicle and including at least an intention related to acceleration and deceleration, and
adjust the set target braking/driving force in accordance with the specified driver's intention.

2. The control apparatus for the vehicle according to claim 1, wherein said controller is configured to perform automatic steering control indicative of controlling the braking/driving force varying device such that the braking/driving force is the set target braking/driving force.

3. The control apparatus for the vehicle according to claim 2, wherein said controller is configured to determine a presence or absence of a driver's steering input, and
said controller ends the automatic steering control if it is determined that there is the steering input in a period of performing the automatic steering control.

4. The control apparatus for the vehicle according to claim 3, wherein said controller determines whether or not at least one of driver steering torque and a driver steering angle is greater than or equal to a standard value, as the presence or absence of the steering input, and ends the automatic steering control if the at least one is greater than or equal to the standard value.

5. The control apparatus for the vehicle according to claim 1, wherein the target steering reaction force is less than or equal to an allowable upper limit set in advance.

6. The control apparatus for the vehicle according to claim 1, wherein the state quantity is a yaw rate of the vehicle, and
wherein said controller sets a target yaw rate, which is a target value of the yaw rate, as the target state quantity.

7. The control apparatus for the vehicle according to claim 1, wherein said controller sets the target braking/driving force on the basis of a kingpin offset, which is a distance between contact center of the steered wheels and virtual contact points of a kingpin axis of the steered wheels, as one portion of the relative relation.

8. The control apparatus for the vehicle according to claim 1, wherein said controller is configured to specify a road surface state, and
wherein said controller adjusts the set target braking/driving force in accordance with the specified road surface state.

9. The control apparatus for the vehicle according to claim 1, wherein said controller sets the target braking/driving force to prioritize a driving force over a braking force.

10. The control apparatus for the vehicle according to claim 1, herein said controller obtains the left-right braking/driving force difference of front wheels and the left-right braking/driving force difference of rear wheels in accordance with an equation:

$$\begin{bmatrix} F_f \\ F_r \end{bmatrix} = \begin{bmatrix} -\frac{t_f}{2} & -\frac{t_r}{2} \\ -k & 0 \end{bmatrix} M \begin{bmatrix} \gamma \\ T \end{bmatrix}$$

wherein "$F_f$" means the left-right braking/driving force difference of front wheels "$F_r$" means the left-right braking/driving force difference of rear wheels, "$t_f$" means a front tread, "$t_r$" means a rear tread, "k" means a kingpin offset, "M" means a vehicle motion matrix, "$\gamma$" means a desired yaw rate as the target state quantity, "T" means a desired steering reaction torque as the predetermined target steering reaction force, and
wherein said controller sets the target braking/driving force such that the calculated left-right braking/driving force difference of front wheels and the calculated left-right braking/driving force difference of rear wheels are realized.

* * * * *